US011871181B2

(12) United States Patent
Tsutsumi et al.

(10) Patent No.: US 11,871,181 B2
(45) Date of Patent: Jan. 9, 2024

(54) SPEAKER ARRAY, SIGNAL PROCESSING DEVICE, SIGNAL PROCESSING METHOD, AND SIGNAL PROCESSING PROGRAM

(71) Applicant: Nippon Telegraph and Telephone Corporation, Tokyo (JP)

(72) Inventors: Kimitaka Tsutsumi, Musashino (JP); Kenta Imaizumi, Musashino (JP); Atsushi Nakadaira, Musashino (JP); Yoichi Haneda, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 180 days.

(21) Appl. No.: 17/633,619

(22) PCT Filed: Jul. 22, 2020

(86) PCT No.: PCT/JP2020/028433
§ 371 (c)(1),
(2) Date: Feb. 8, 2022

(87) PCT Pub. No.: WO2021/024806
PCT Pub. Date: Feb. 11, 2021

(65) Prior Publication Data
US 2022/0321998 A1 Oct. 6, 2022

(30) Foreign Application Priority Data
Aug. 8, 2019 (JP) ................................ 2019-145975

(51) Int. Cl.
*H04R 1/40* (2006.01)
*H04R 1/34* (2006.01)
*H04S 7/00* (2006.01)

(52) U.S. Cl.
CPC ............ *H04R 1/403* (2013.01); *H04R 1/345* (2013.01); *H04S 7/301* (2013.01); *H04S 2400/15* (2013.01)

(58) Field of Classification Search
None
See application file for complete search history.

(56) References Cited

U.S. PATENT DOCUMENTS 10,433,093 B2 * 10/2019 Setiawan ................ H04S 7/302
2013/0216070 A1 8/2013 Keiler et al.

FOREIGN PATENT DOCUMENTS

JP 2011244306 12/2011
JP 2012169895 9/2012
(Continued)

OTHER PUBLICATIONS

Haneda et al., "Directivity synthesis using multipole sources based on spherical harmonic expansion," Journal of the Acoustical Society of Japan, 2013, 69(11):577-588, 25 pages (with English Translation).
(Continued)

*Primary Examiner* — Kenny H Truong
(74) *Attorney, Agent, or Firm* — Fish & Richardson P.C.

(57) ABSTRACT

The scale of an apparatus that reproduces a sound field is reduced. A speaker array 1 includes a plurality of speakers arranged at intersections of a first plurality of virtual lines arranged parallel to each other at equal intervals and a second plurality of virtual lines that are perpendicular to the first plurality of virtual lines and are arranged parallel to each other at equal intervals, wherein multipoles of a given order are superimposed using the plurality of speakers to realize wave field synthesis.

1 Claim, 9 Drawing Sheets

(56) References Cited

FOREIGN PATENT DOCUMENTS

| | | |
|---|---|---|
| JP | 2013545391 | 12/2013 |
| JP | 2019047478 | 3/2019 |

OTHER PUBLICATIONS

Spors et al., "Physical and Perceptual Properties of Focused Sources in Wave Field Synthesis," 127th Audio Engineering Society Convention paper 7914, Oct. 9, 2009, 19 pages.

* cited by examiner (a)

(b)

(c)

(d)

SPEAKER ARRAY, SIGNAL PROCESSING DEVICE, SIGNAL PROCESSING METHOD, AND SIGNAL PROCESSING PROGRAM

CROSS-REFERENCE TO RELATED APPLICATIONS

This application is a National Stage application under 35 U.S.C. § 371 of International Application No. PCT/JP2020/028433, having an International Filing Date of Jul. 22, 2020, which claims priority to Japanese Application Serial No. 2019-145975, filed on Aug. 8, 2019, the disclosure of both of which are considered part of the disclosure of this application, and are incorporated in their entirety into this application.

TECHNICAL FIELD

The present invention relates to a speaker array, a signal processing apparatus, a signal processing method, and a signal processing program.

BACKGROUND ART

In public viewing and concerts, audio and music are played through a plurality of speakers installed at a screening venue. Sound reproduction that reproduces a sound field of a recording venue as it is using a large number of speakers has been used in recent years.

There is also an acoustic technology for generating a direction in which sound strongly propagates (a bright zone) and a direction in which sound hardly propagates (a dark zone) using a large number of speakers. There are applications such as personal audio that utilize this technology to allow audio content to be enjoyed while protecting privacy at home or in public facilities such as museums.

A speaker array control technique such as a wave field synthesis technique has been widely used as a technique for generating such a sound field.

There is a method called wave field synthesis for sound reproduction technology for reproducing a sound field of a recording location in a screening space (PTL 1). In the method based on PTL 1, after an acoustic signal at a location where the acoustic signal is recorded is collected by microphones installed at a plurality of locations, the arrival directions of the acoustic signal in vertical and horizontal directions are analyzed to physically reproduce the acoustic signal of the recording venue using a plurality of speakers installed in the screening space.

There is a technology in which an acoustic sink in a target sound field to be reproduced is assumed and a drive signal derived from a first-type Rayleigh integral is given to a speaker array to generate a sound image in front of speakers (NPL 1).

There is also a multipole sound source as a method of controlling the directivity of sound radiated from speakers (NPL 2). A multipole sound source is a technique for expressing the directivity of sound using a combination of primitive directivities such as dipoles and quadrupoles. Each of the primitive directivities is realized with a combination of sound sources of different polarities close to each other.

CITATION LIST

Patent Literature

PTL 1: JP 2011-244306A

Non Patent Literature

NPL 1: Sascha Spors, Hagen Wierstorf, Matthias Gainer, and Jens Ahrens, "Physical and Perceptual Properties of Focused Sources in Wave Field Synthesis," in 127th Audio Engineering Society Convention paper 7914, 2009, October.

NPL 2: Yoichi Haneda, Kenichi Furuya, Suehiro Shimauchi, "Directivity Synthesis Using Multipole Sound Sources Based on Spherical Harmonic Function Expansion", Journal of the Acoustical Society of Japan, Vol. 69, No. 11, pp. 577-588, 2013.

SUMMARY OF THE INVENTION

Technical Problem

However, the methods described in PTL 1 and NPL 1 require a large number of speaker arrays covering the screening venue in order to reproduce a sound field in the entire screening venue, which may increase the scale of the apparatus.

Therefore, it is an object of the present invention to provide a technique for reducing the scale of the apparatus that reproduces a sound field.

Means for Solving the Problem

A speaker array of an aspect of the present invention includes a plurality of speakers arranged at intersections of a first plurality of virtual lines arranged parallel to each other at equal intervals and a second plurality of virtual lines that are perpendicular to the first plurality of virtual lines and are arranged parallel to each other at equal intervals, wherein multipoles of a given order are superimposed using the plurality of speakers to realize wave field synthesis.

A signal processing apparatus of an aspect of the present invention includes a filter coefficient determination unit configured to calculate weighting coefficients for a plurality of speakers according to positions of the plurality of speakers, the plurality of speakers being arranged at intersections of a first plurality of virtual lines arranged parallel to each other at equal intervals and a second plurality of virtual lines that are perpendicular to the first plurality of virtual lines and are arranged parallel to each other at equal intervals, and a convolution calculation unit configured to multiply the weighting coefficients for the plurality of speakers by input signals to calculate output signals to be reproduced by the plurality of speakers.

A signal processing apparatus of an aspect of the present invention includes a filter coefficient determination unit configured to calculate weighting coefficients to be assigned to a plurality of speakers from weighting coefficients to be assigned to multipoles of a given order superimposed by the plurality of speakers and positions of the plurality of speakers, the plurality of speakers being arranged at intersections of a first plurality of virtual lines arranged parallel to each other at equal intervals and a second plurality of virtual lines that are perpendicular to the first plurality of virtual lines and are arranged parallel to each other at equal intervals, and a convolution calculation unit configured to multiply the weighting coefficients for the plurality of speakers by input signals to calculate output signals to be reproduced by the plurality of speakers.

A signal processing apparatus of an aspect of the present invention includes a focal coordinate determination unit configured to determine, as positions of a plurality of focused sound sources used to superimpose multipoles of a given order, intersections of a first plurality of virtual lines arranged parallel to each other at equal intervals and a second plurality of virtual lines that are perpendicular to the first plurality of virtual lines and are arranged parallel to each other at equal intervals, a circular harmonic series conversion unit configured to calculate weighting coefficients to be assigned to the multipoles of the given order superimposed by the plurality of focused sound sources from a circular harmonic series, a filter coefficient calculation unit configured to calculate weighted driving functions to be assigned to a plurality of speakers constituting a linear speaker array from the positions of the plurality of focused sound sources and the weighting coefficients assigned to the multipoles, and a convolution calculation unit configured to convolve the weighted driving functions with input signals to calculate output signals to be given to the plurality of speakers.

A signal processing method of an aspect of the present invention includes calculating, by a computer, weighting coefficients for a plurality of speakers according to positions of the plurality of speakers, the plurality of speakers being arranged at intersections of a first plurality of virtual lines arranged parallel to each other at equal intervals and a second plurality of virtual lines that are perpendicular to the first plurality of virtual lines and are arranged parallel to each other at equal intervals, and multiplying, by a computer, the weighting coefficients for the plurality of speakers by input signals to calculate output signals to be reproduced by the plurality of speakers.

One aspect of the present invention is a signal processing program for causing a computer to operate as the signal processing apparatus.

Effects of the Invention

According to the present invention, it is possible to provide a technique for reducing the scale of the apparatus that reproduces a sound field.

DESCRIPTION OF EMBODIMENTS

Hereinafter, embodiments of the present invention will be described with reference to the drawings. In the description of the drawings, the same parts are denoted by the same reference signs and the description thereof will be omitted.

First Embodiment

Figure 1:
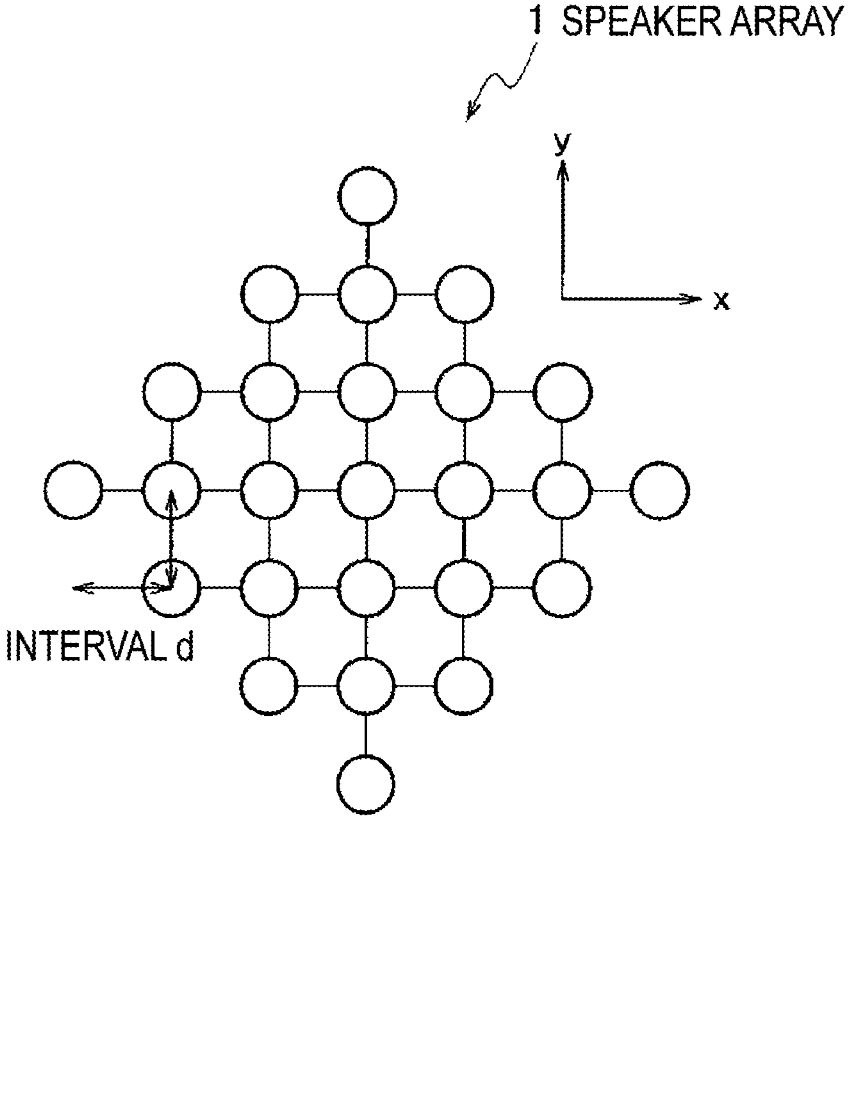
FIG. 1 is a diagram illustrating a speaker array according to a first embodiment.

As illustrated in FIG. 1, a speaker array 1 according to a first embodiment includes a plurality of speakers arranged at intersections of a first plurality of virtual lines arranged parallel to each other at equal intervals and a second plurality of virtual lines perpendicular to the first plurality of virtual lines and arranged parallel to each other at equal intervals. The speaker array 1 realizes wave field synthesis by superimposing multipoles of a given order using a plurality of speakers. The speakers of the speaker array 1 according to the first embodiment are arranged symmetrically with respect to a center point of the speaker array 1. The given order is a predetermined order which is determined in advance at the time of designing the speaker array 1 or the like.

The plurality of speakers of the speaker array 1 according to the embodiment of the present invention are formed in an xy plane as illustrated in FIG. 1. The speaker array 1 illustrated in FIG. 1 realizes 3rd-order multipoles. The speaker array 1 can reproduce a given sound field at given polar coordinates with respect to the position of the speaker array 1.

The speakers illustrated in FIG. 1 are arranged, for example, in a grid pattern at equal intervals such as 1 cm. The speaker array 1 reproduces a sound field that can reproduce the phase of sound as well with high accuracy, similar to the wave field synthesis technique. By arranging speakers closely, the speaker array 1 can reproduce a highly accurate sound field regardless of the size of a screening venue. The speaker array 1 can be significantly downsized as compared with a conventional circular speaker array or the like which has been required to reproduce a sound field.

In FIG. 1, the first plurality of virtual lines are lines provided in parallel in the x-axis direction at equal intervals. The second plurality of virtual lines are lines provided in parallel in the y-axis direction at equal intervals. In the example illustrated in FIG. 1, the plurality of virtual lines extending in the x-axis direction are provided at an interval d from each other. The plurality of virtual lines extending in the y-axis direction are provided at an interval d from each other. The speakers are provided at the intersections of the first plurality of virtual lines and the second plurality of virtual lines. The interval d is the interval between virtual lines in parallel, and at the same time, the distance between adjacent speakers on a virtual line. In FIG. 1, virtual lines are shown as solid lines. Virtual lines are not essential in the configuration of the speaker array 1.

Each of the plurality of speakers reproduces a signal calculated by a signal processing apparatus 2 which will be described later, thereby realizing a sound field that protrudes in front of the speakers and has directivity. The signal processing apparatus 2 weights multipoles realized in the speaker array 1 to calculate input signals to the speakers.

The speaker array 1 realizes multipoles of a given order distributed in a plane. In the embodiments of the present invention, a basis multipole which is a multipole having an m-th order in the x-axis direction and an n-th order in the y-axis direction is defined as a (m, n) multipole. Basis multipoles refer to basic multipoles which are generally called dipoles, quadrupoles, or the like.

Figure 2:
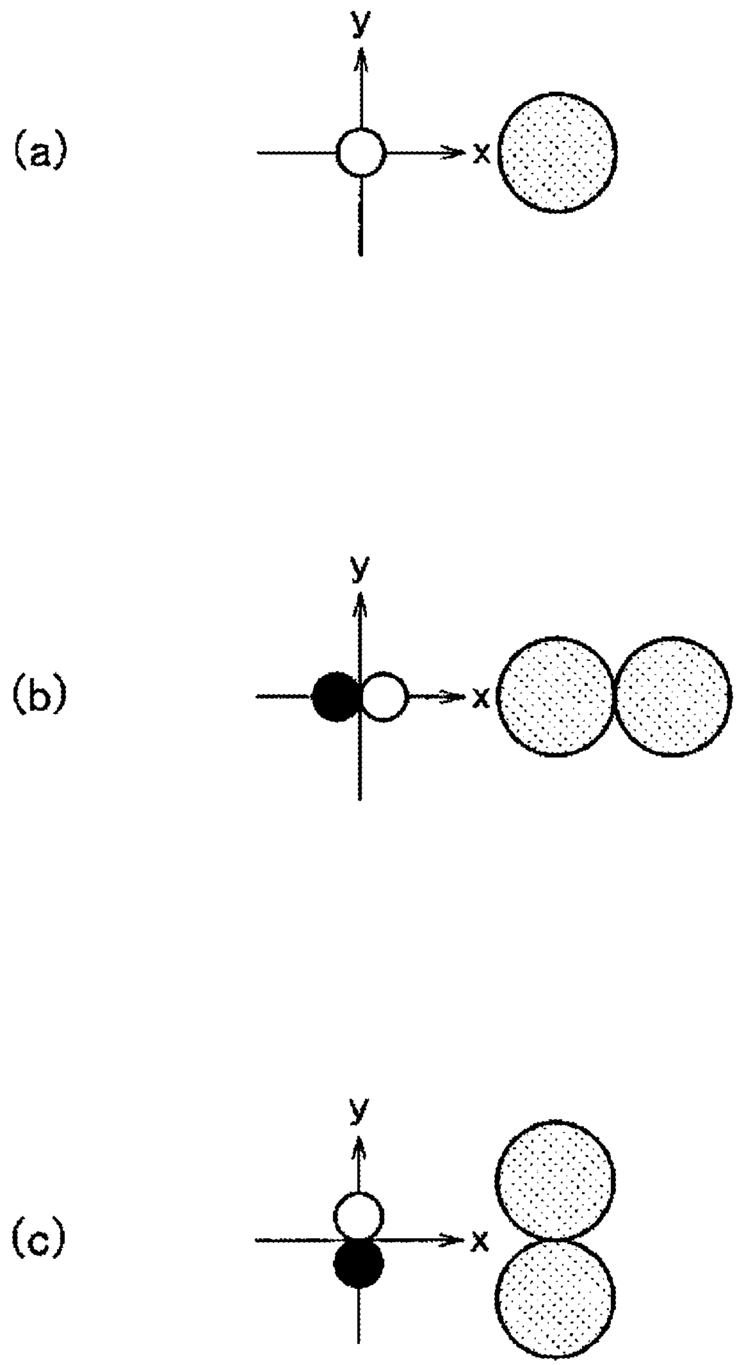
FIG. 2 is a (first) diagram illustrating multipoles.
Figure 3:
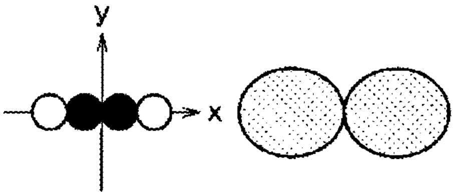
FIG. 3 is a (second) diagram illustrating multipoles.
Figure 3:
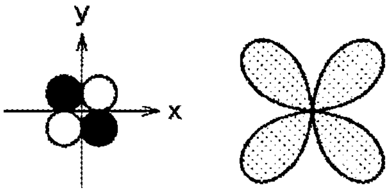
Figure 3:
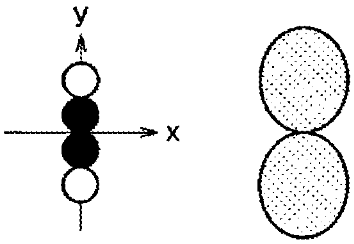
Figure 3:
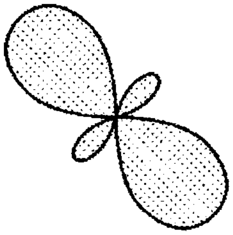

Basis multipoles and the directivity of their sound fields will be described with reference to FIGS. 2 and 3. In FIGS. 2 and 3, "○" is a positive-polarity monopole. "●" is a negative-polarity monopole. The negative-polarity monopole is a positive-polarity monopole inverted in amplitude. In FIGS. 2 and 3, shading on the right side indicates a sound field formed by the arrangement of monopoles on the left side.

FIG. 2(*a*) illustrates a sound field formed by one positive-polarity monopole. The sound field of FIG. 2(*a*) is formed in a circular shape. The sound field formed by one monopole has no directivity.

FIGS. 2(*b*) and 2(*c*) illustrate sound fields formed by dipoles. A dipole is formed by one positive-polarity monopole and one negative-polarity monopole. FIGS. 2(*b*) and 2(*c*) show that different sound fields are formed depending on how monopoles are arranged. These sound fields have different directivities.

FIGS. 3(*a*) to 3(*c*) illustrate sound fields formed by quadrupoles. A quadrupole is formed by two positive-polarity monopoles and two negative-polarity monopoles. FIGS. 3(*a*) to 3(*c*) show that different sound fields are formed depending on both how the four monopoles are arranged and the polarities of the monopoles. These sound fields have different directivities.

FIG. 3(*d*) illustrates an example of a sound field obtained by weighting and superimposing the basis multipoles of FIGS. 2(*b*) to 2(*c*) and FIGS. 3(*a*) to 3(*c*). Sound fields having various directivities can be realized by weighting predetermined basis multipoles by predetermined weights.

In order to superimpose multipoles of up to an N-th order, speakers are arranged at coordinates obtained by calculating equation (1) for 0≤m≤N.

Figure 4:
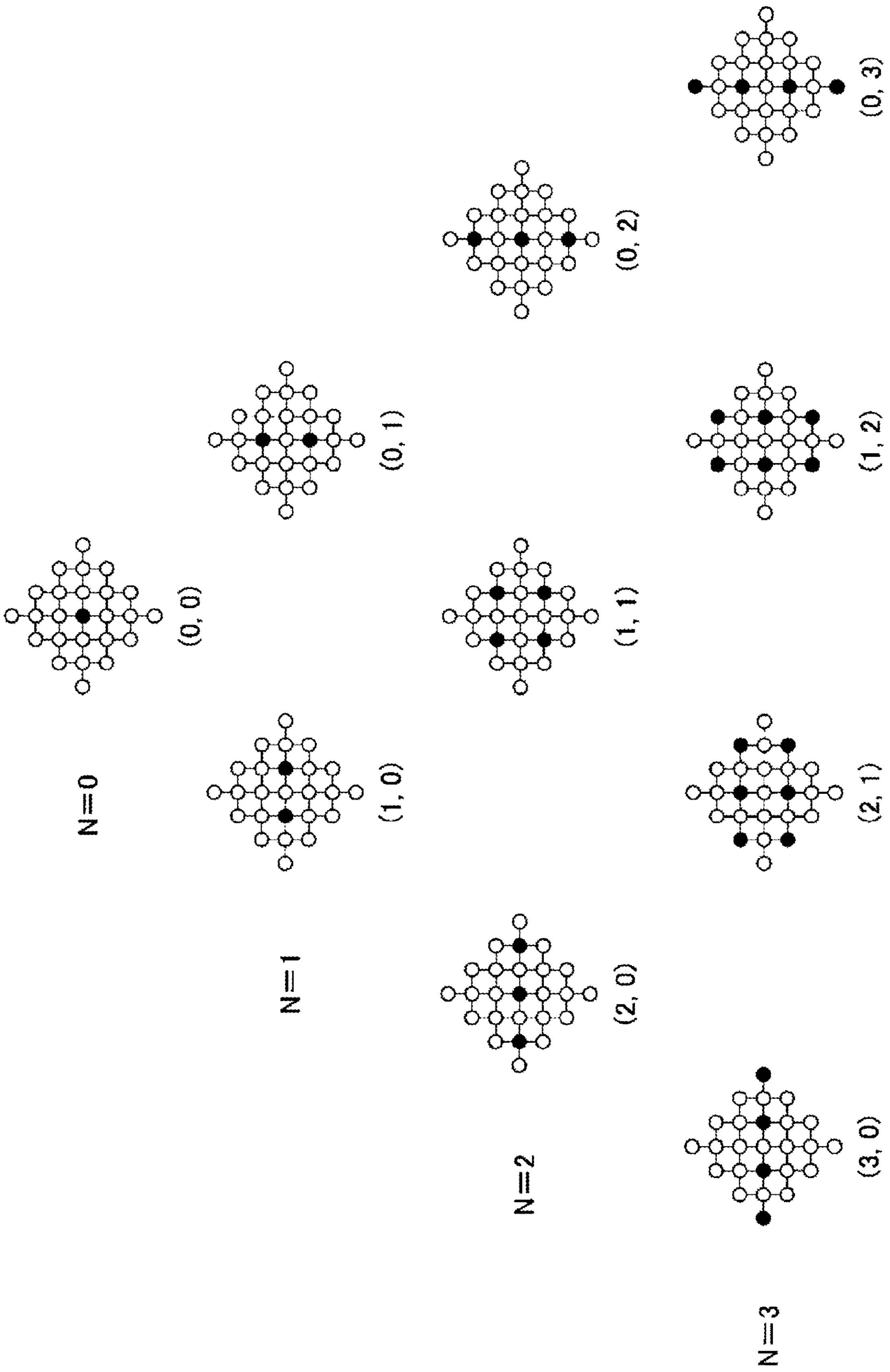
FIG. 4 is a diagram illustrating speakers driven to realize an N-th order ($0 \leq N \leq 3$).

[Math. 1]

$$x=(m-2\mu)d\,(0\le\mu\le m)$$

$$y=(n-2\nu)d\,(0\le\nu\le n) \qquad \text{Equation (1)}$$

m, n: Order numbers of multipole in x- and y-axis directions
where N=m+n, m≥0, and n≥0
N: Order number of multipoles superimposed by speaker array
μ, v: Indices of speaker in x- and y-axis directions
d: Interval between adjacent speakers FIG. 4 illustrates speakers driven to realize the N-th order (0≤N≤3). "●" in FIG. 4 indicates the position of speakers to be driven to realize each of a 0th-order (0, 0) multipole, 1st-order (1, 0) and (0, 1) multipoles, 2nd-order (2, 0), (1, 1), and (0, 2) multipoles, and 3rd-order (3, 0), (2, 1), (1, 2), and (0, 3) multipoles. A sound field with 3rd-order multipoles superimposed is realized by superimposing the multipoles illustrated in FIG. 4.

A speaker in the center of each diagram shown in FIG. 4 is driven when realizing the sound fields of the (0, 0), (2, 0), and (0, 2) multipoles. In the center, it suffices to dispose a single speaker even when performing driving to realize a plurality of multipoles. Each of the (0, 0) multipoles, (2, 0) multipoles, and (0, 2) multipoles is realized with this single speaker.

The speaker array 1 according to the first embodiment has a plurality of speakers closely arranged in a grid pattern. Thus, the speaker array 1 can reduce the area in which the speaker array 1 is disposed. By superimposing multipoles of a given order using a plurality of speakers closely arranged in a grid pattern, the speaker array 1 can also reproduce a sound field that can reproduce the phase of sound as well with high accuracy, similar to the wave field synthesis technique.

Second Embodiment

A second embodiment will be described with respect to a method of reproducing the same sound fields as those generated by the basis multipoles using the speaker array 1 according to the first embodiment.

Figure 5:
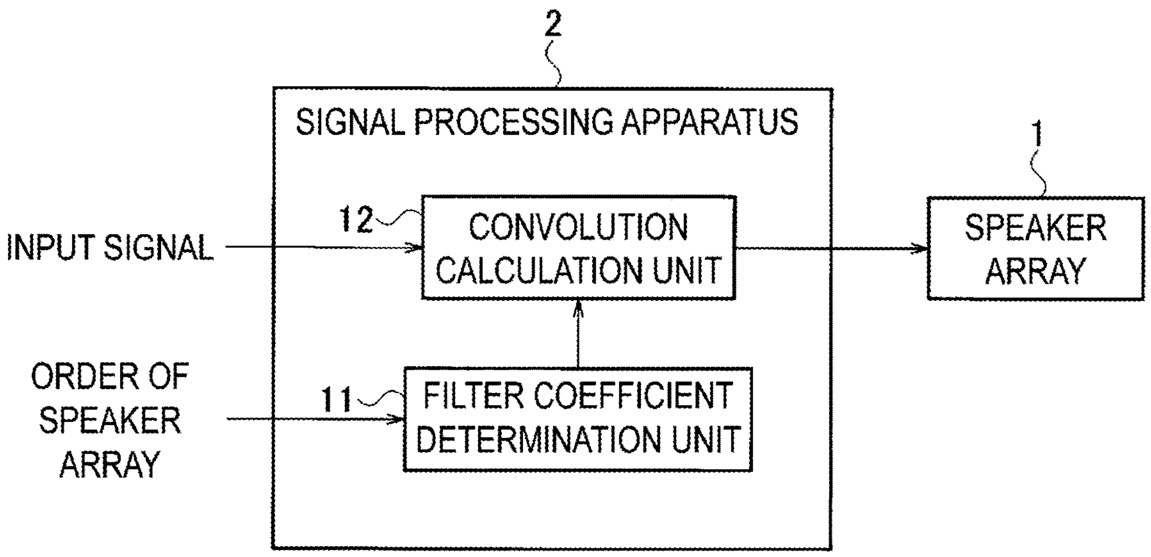
FIG. 5 is a diagram illustrating a signal processing apparatus according to a second embodiment.

Signals to be reproduced by the speakers are processed by the signal processing apparatus 2 illustrated in FIG. 5. The signal processing apparatus 2 is a general computer including a processing apparatus, a storage device, and the like.

The signal processing apparatus 2 includes a filter coefficient determination unit 11 and a convolution calculation unit 12.

The filter coefficient determination unit 11 calculates weighting coefficients for the plurality of speakers included in the speaker array 1 according to the first embodiment illustrated in FIG. 1 according to the positions of the speakers. The filter coefficient determination unit 11 receives the order of the speaker array 1 as an input from the outside and specifies the positions of the speakers of the speaker array 1 using equation (1).

The weighting coefficients for the plurality of speakers are calculated using equation (2). In equation (2), each speaker illustrated in FIG. 1 is identified using an index (μ, v) (0≤μ≤m, 0≤v≤n).

[Math. 2]

$$g_{\mu,\nu}^{m,n}=(j2dk)^{m+n}\cdot g_{\mu}^{m}\cdot g_{\nu}^{n} \qquad \text{Equation (2)}$$

$$g_{\zeta}^{X}=\begin{cases}1 & (\zeta=0)\\ g_{\zeta}^{X-1}-g_{\zeta-1}^{X-1} & (0<\zeta<X)\\ -g_{\zeta-1}^{X-1} & (\zeta=X)\end{cases}$$

m, n: Order numbers of multipole in x- and y-axis directions
where N=m+n, m≥0, and n≥0
μ,v: Indices of speaker in x- and y-axis directions
X: Variable indicating m or n
ζ: Variable indicating μ or v
j: Imaginary unit
d: Interval between adjacent speakers
k: Wavenumber (k=2πf/c)
f and c are frequency and sonic velocity of audio signal to be controlled The convolution calculation unit 12 multiplies weighting coefficients for the plurality of speakers by the input signals to calculate output signals to be reproduced by the plurality of speakers. An output signal is calculated for each speaker. The output signals are signals to be reproduced by the speakers. As shown in equation (3), the output signal of each speaker is obtained by multiplying the input signal by the weight calculated for the speaker using equation (2).

[Math. 3]

$$S_{\mu,\nu}(\omega)=g_{\mu,\nu}^{m,n}\cdot S(\omega) \qquad \text{Equation (3)}$$

S(ω): Input signal
$S_{\mu,\nu}(\omega)$: Signal reproduced through speaker (μ, v)

In the second embodiment, the same sound fields as those generated by the basis multipoles can be reproduced by inputting signals obtained by multiplying the input signals by the weighting coefficients calculated using equation (2) to the speakers.

Third Embodiment

A third embodiment will be described with respect to a method of realizing a sound field generated by a sound source having complicated directivity with the speaker array 1 according to the first embodiment.

Figure 6:
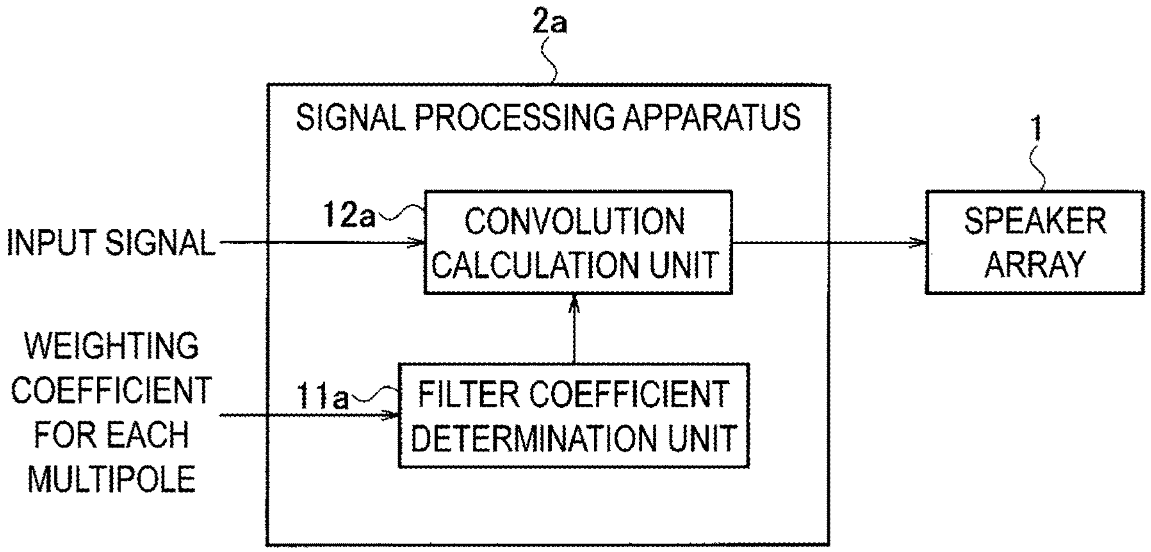
FIG. 6 is a diagram illustrating a signal processing apparatus according to a third embodiment.

Signals to be reproduced by the speakers are processed by a signal processing apparatus 2*a* illustrated in FIG. 6. The signal processing apparatus 2*a* according to the third embodiment has the same configuration as the signal processing apparatus 2 according to the second embodiment, but the processing of each component thereof is different from that of the second embodiment.

A filter coefficient determination unit 11*a* calculates weighting coefficients for the plurality of speakers of the speaker array 1 according to the first embodiment from weighting coefficients $w^{m,n}$ assigned to multipoles of a given order superimposed by the plurality of speakers and the positions of the speakers. The filter coefficient determination unit 11*a* receives the order of the speaker array 1 from the outside and specifies the positions of the speakers of the speaker array 1 using equation (1). The filter coefficient determination unit 11*a* calculates the weighting coefficients for the speakers from the outside using the weighting coefficients of the multipoles realized by the speaker array 1.

The weighting coefficients for the plurality of speakers are calculated using equation (4) and the weighting coefficients $w^{m,n}$ assigned to the multipoles of a given order. Equation (4) is a transformation of equation (2) using the weighting coefficients assigned to the (m, n) multipoles.

[Math. 4]

$$\hat{g}^{m,n}_{\mu,\nu} = w^{m,n}\cdot(j2dk)^{m+n}\cdot g^m_\mu \cdot g^n_\nu \qquad \text{Equation (4)}$$

$$g^X_\zeta = \begin{cases} 1 & (\zeta = 0) \\ g^{X-1}_\zeta - g^{X-1}_{\zeta-1} & (0 < \zeta < X) \\ -g^{X-1}_{\zeta-1} & (\zeta = X) \end{cases}$$

$w^{m,n}$: Weighting coefficient assigned to (m, n) multipole m, n: Order numbers of multipole in x- and y-axis directions where N=m+n, m≥0, and n≥0

μ,ν: Indices of speaker in x- and y-axis directions

X: Variable indicating m or n

ζ: Variable indicating μ or ν j: Imaginary unit d: Interval between adjacent speakers k: Wavenumber (k=2πf/c)

f and c are frequency and sonic velocity of audio signal to be controlled

A convolution calculation unit 12*a* multiplies weighting coefficients $w^{m,n}$ for the plurality of speakers by the input signals to calculate output signals to be reproduced by the plurality of speakers. An output signal is calculated for each speaker. The output signals are signals to be reproduced by the speakers. As shown in equation (5), the output signal of each speaker is obtained by multiplying the input signal by the weight calculated for the speaker using equation (4). Equation (5) shows that the input signal multiplied by the summation of the weighting coefficients $w^{m,n}$ calculated using equation (4) while varying m and n over the ranges of 0≤m≤N and 0≤m≤N−m for the speaker corresponding to the index (α, β) is the output signal to be reproduced by the speaker.

[Math. 5]

$$S_{\alpha,\beta}(\omega) = \left(\sum_{m=0}^{N}\sum_{n=0}^{N-m} \hat{g}^{m,n}_{\mu',\nu'}\right)\cdot S(\omega) \qquad \text{Equation (5)}$$

$$\mu' = \frac{m-\alpha}{2}$$

$$\nu' = \frac{n-\beta}{2}$$

S(ω): Input signal $S_{\mu,\nu}(\omega)$: Signal reproduced through speaker (μ, ν)

$\hat{g}_{\mu',\nu'}^{m,n}0$ when at least one of μ' and ν' is not an integer

The weighting coefficient $w^{m,n}$ to be assigned to the (m, n) multipole can be obtained, typically for a directional sound source which is a target on the sound collecting side, using a least squares method or the like for signals observed at control points arranged on a unit circle surrounding the sound source. Values calculated using the least squares method for the signals observed at the control points arranged on the unit circle can be calculated as elements of a matrix W by solving equation (6).

[Math. 6]

$$W=(G^HG+\lambda I)^{-1}G^HS$$

$$W=[w^{0,0}\ldots w^{0,N}]^T$$

$$S=[S_0(\omega)\ldots S_{L-1}(\omega)]^T$$

$$G=[g_0\ldots g_{L-1}]$$

$$g_q=[u_{0,0}{}^q\ldots u_{0,n}{}^q]^T$$

$$u_{m,n}{}^q=G_{2D}(r_q,k)\cdot(2dk)^{m+n}\cos^m\phi_q\sin^n\phi_q \qquad \text{Equation (6)}$$

L: Number of control points set on unit circle at equal intervals

In the third embodiment of the present invention, a sound field generated by a sound source having a desired directivity can be reproduced by reproducing the output signals calculated using equation (5) through the speakers.

Fourth Embodiment

The third embodiment has been described with reference to the case where the weighting coefficients $w^{m,n}$ to be assigned to the multipoles are obtained using the least squares method or the like. However, the least squares method sometimes fails to reliably obtain the weighting coefficients $w^{m,n}$ because the least squares method often causes an underdetermined problem. A fourth embodiment will be described with reference to the case where the weighting coefficients $w^{m,n}$ of the multipoles are analytically calculated from a circular harmonic series. The fourth embodiment is suitable when a circular harmonic series $C_{m+n}$ can be obtained from a sound field generated by a directional sound source which is a target on the sound collecting side.

Figure 7:
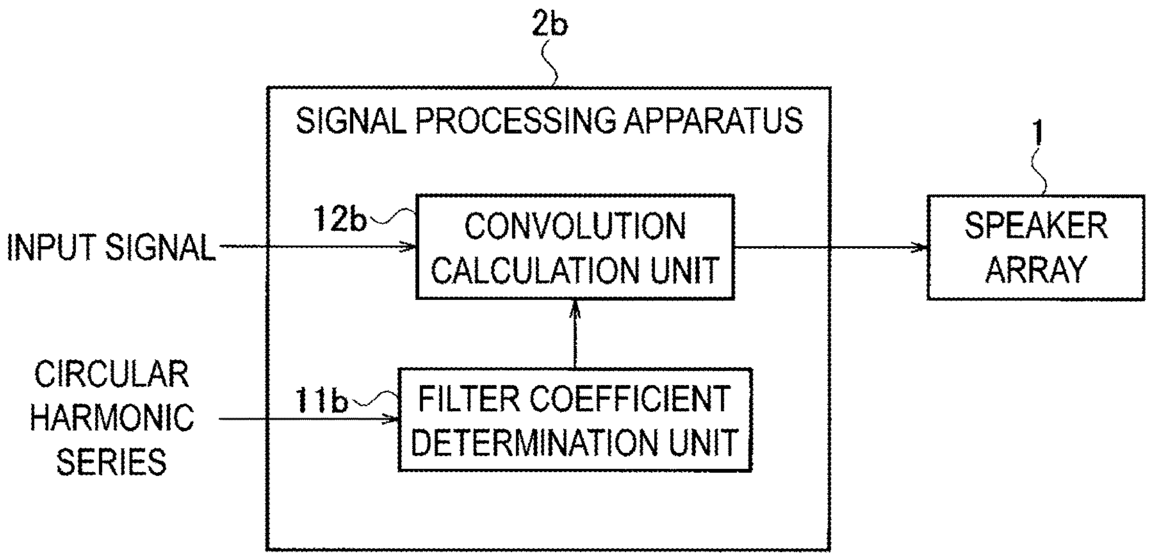
FIG. 7 is a diagram illustrating a signal processing apparatus according to a fourth embodiment.

Signals to be reproduced by the speakers are processed by a signal processing apparatus 2*b* illustrated in FIG. 7. The signal processing apparatus 2*b* according to the fourth embodiment has the same configuration as the signal processing apparatus 2*a* according to the third embodiment, but the processing of each component thereof is different from that of the third embodiment.

A filter coefficient determination unit 11*b* calculates weighting coefficients $w^{m,n}$ to be assigned to the multipoles of a given order superimposed by the plurality of speakers of the speaker array 1 according to the first embodiment from a circular harmonic series $C_{m+n}$. The filter coefficient determination unit 11*b* receives the order of the speaker array 1 from the outside and specifies the positions of the speakers of the speaker array 1 using equation (1). The filter coefficient determination unit 11*b* calculates the weighting coefficient of each multipole realized by the speaker array 1 from a circular harmonic series in a sound collecting environment from the outside.

The filter coefficient determination unit 11*b* calculates the weighting coefficient $w^{m,n}$ to be assigned to each multipole by substituting the circular harmonic series $C_{m+n}$ into equation (7).

[Math. 7]

$$w^{m,n} = \frac{4j^{n-1}}{(-k)^{m+n}}\binom{m+n}{n}\{C_{m+n} + (-1)^m C_{-m-n}\} \quad \text{Equation (7)}$$

$w^{m,n}$: Weighting coefficient assigned to (m, n) multipole
m,n: Order numbers of multipole in x- and y-axis directions
where $N=m+n$, $m\geq 0$, and $n\geq 0$
j: Imaginary unit
k: Wavenumber ($k=2\pi f/c$)
f and c are frequency and sonic velocity of audio signal to be controlled
$C_{m+n}$: Circular harmonic series The filter coefficient determination unit 11*b* further calculates the weighting coefficient to be assigned to each speaker from the above equation (4) and the weighting coefficients $w^{m,n}$ assigned to the multipoles of a given order.

When the weighting coefficient to be assigned to each speaker has been calculated, the same processing as in the third embodiment is performed. Specifically, a convolution calculation unit 12*b* multiplies weighting coefficients $w^{m,n}$ for the plurality of speakers by the input signals to calculate output signals to be reproduced by the plurality of speakers. An output signal is calculated for each speaker. The output signals are signals to be reproduced by the speakers. As shown in the above equation (5), the output signal of each speaker is obtained by multiplying the input signal by the weight calculated for the speaker using equation (4). Equation (5) shows that the input signal multiplied by the summation of the weighting coefficients $w^{m,n}$ calculated using equation (4) while varying m and n over the ranges of $0\leq m\leq N$ and $0\leq m\leq N-m$ for the speaker corresponding to the index ($\alpha$, $\beta$) is the output signal to be reproduced by the speaker.

In the fourth embodiment, the signal processing apparatus 2*b* calculates the weighting coefficients $w^{m,n}$ of the multipoles from a circular harmonic series and calculates a weight to be assigned to each speaker from the weighting coefficients $w^{m,n}$ of the multipoles as described above. The signal processing apparatus 2*b* can further multiply the input signal by the weight assigned to each speaker of the speaker array 1 to generate a signal to be input to the speaker. The fourth embodiment can reproduce a sound field accurately by avoiding the least squares method which often causes an underdetermined problem.

Fifth Embodiment

In a fifth embodiment, a linear speaker array in which a plurality of speakers are arranged in a straight line is used and multipoles are weighted to realize a multipole sound source that protrudes in front of speakers and has directivity. In the fifth embodiment, a linear speaker array is used and multipoles are weighted to realize a multipole speaker array in which a plurality of focused sound sources are arranged in a grid pattern as illustrated in FIG. 1.

The fifth embodiment will be described with reference to the case where the speakers of the speaker array are arranged in a straight line, but the present invention is not limited to this. The speaker array includes a plurality of speakers, while the plurality of speakers do not have to be arranged in a straight line.

In the fifth embodiment, a multipole sound source is realized by creating two or more focused sound sources of different polarities at positions close to each other. A focused sound source is a combination of non-directional point sound sources (monopole sound sources) of different polarities.

Figure 8:
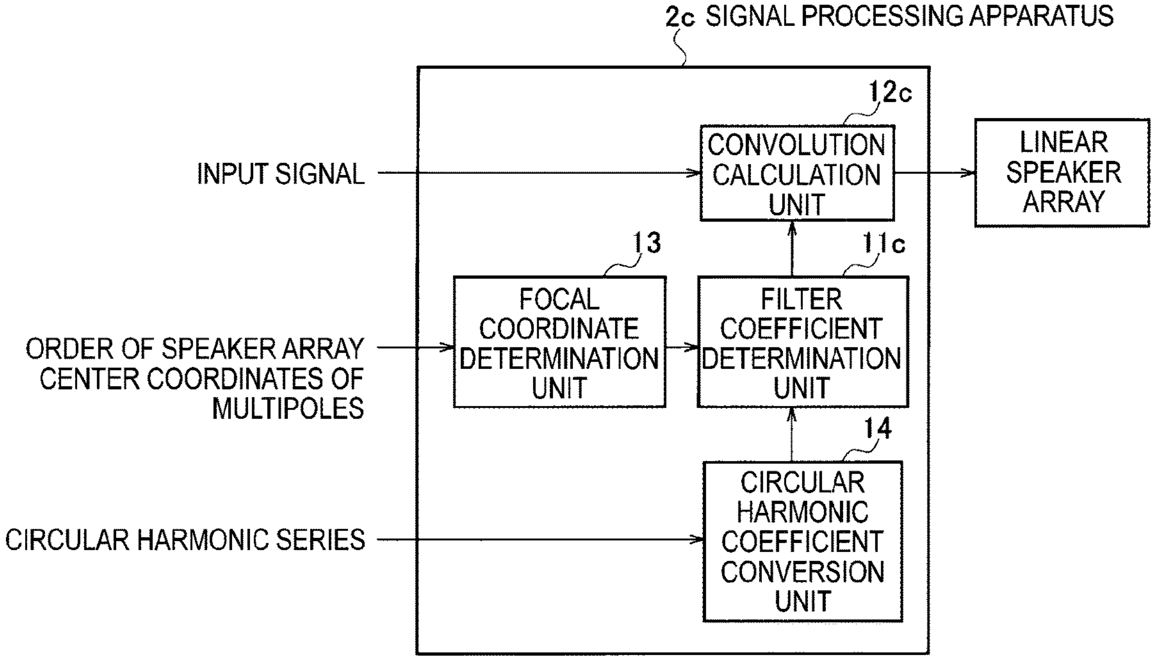
FIG. 8 is a diagram illustrating a signal processing apparatus according to a fifth embodiment.

Signals to be reproduced by the speakers are processed by a signal processing apparatus 2*c* illustrated in FIG. 8. The signal processing apparatus 2*c* includes a focal coordinate determination unit 13, a circular harmonic series conversion unit 14, a filter coefficient determination unit 11*c*, and a convolution calculation unit 12*c*.

The focal coordinate determination unit 13 determines the intersections of a first plurality of virtual lines arranged parallel to each other at equal intervals and a second plurality of virtual lines perpendicular to the first plurality of virtual lines and arranged parallel to each other at equal intervals as the positions of a plurality of focused sound sources used to superimpose multipoles of a given order. The positions of the focused sound sources are provided symmetrically with respect to the center coordinates of the multipoles.

The focal coordinate determination unit 13 determines the positions of the focused sound sources according to equation (8).

[Math. 8]

$$x=x_c+(m-2\mu)d\,(0\leq\mu\leq m)$$

$$y=y_c+(n-2\nu)d\,(0\leq\nu\leq n) \quad \text{Equation (8)}$$

($x_c$, $y_c$): Center coordinates of multipole
m,n: Order numbers of multipole in x- and y-axis directions
where $N=m+n$, $m\geq 0$, and $n\geq 0$
$\mu$,$\nu$: Indices of speaker in x- and y-axis directions Multipole sound sources are constructed by creating focused sound sources at coordinates obtained by calculating equation (8) for $0\leq m\leq N$ and $0\leq n\leq N-m$.

The circular harmonic series conversion unit 14 calculates weighting coefficients to be assigned to multipoles of a given order superimposed by the focused sound sources from a circular harmonic series.

The circular harmonic series conversion unit 14 calculates the weighting coefficients $w^{m,n}$ to be assigned to the multipoles by substituting the circular harmonic series $C_{m+n}$ into equation (7) as in the fourth embodiment.

The filter coefficient determination unit 11*c* calculates weighted driving functions to be assigned to the plurality of speakers of the linear speaker array from the positions of the focused sound sources and the weighting coefficients assigned to the multipoles.

The filter coefficient determination unit 11*c* calculates weighted driving functions to be convolved with input signals for the speakers of the linear speaker array based on each pair of focal coordinates determined by the focal coordinate determination unit 13. The filter coefficient determination unit 11*c* calculates a driving function using each pair of focal coordinates. For each multipole, the filter coefficient determination unit 11*c* calculates a weighted driving function to be assigned to each speaker from a combined driving function that is calculated from the coordinates and driving functions of focused sound sources constituting the multipole and a weight assigned to the multipole. Here, the filter coefficient determination unit 11*c* calculates the combined driving function of the multipole by summing functions multiplied by driving functions for the coordinates of focused sound sources included in the multipole. The filter coefficient determination unit 11*c* calculates a weighted driving function to be assigned to each speaker by weighting combined driving functions calculated for the multipoles by weights assigned to the multipoles and summing the resulting combined driving functions.

First, when calculating a weighted driving function for a given speaker, the filter coefficient determination unit 11*c* calculates a driving function for each focused sound source using equation (9).

[Math. 9]

$$D_{2.5D}(x_i, x, \omega) = -\frac{jk}{2} g_0 \frac{y_i - y}{|x_i - x|} H_1^{(1)}(k|x_i - x|), \quad \text{Equation (9)}$$

Position of focused sound source x=(x, y)
Position of i-th speaker $x_i=(x_i,y_i)$
k: Wavenumber (k=ω/c), c: Sonic velocity
ω: Each frequency (ω=2πf), f: Frequency
$j=\sqrt{-1}$, $H_1^{(1)}$: Hankel Function of first kind of order 1

The filter coefficient determination unit 11*c* calculates a weighted driving function for each speaker using the weights calculated by the circular harmonic series conversion unit 14.

[Math. 10]

$$D(x_i,\omega)\Sigma_{\alpha=-N}^{N}\Sigma_{\beta=-N+|\alpha|}^{N-|\alpha|}S_{\alpha,\beta}(\omega)\cdot D_{2.5D}(x_i,x_{\alpha,\beta},\omega) \quad \text{Equation (10)}$$

N: Order number of multipoles superimposed by speaker array
α, β: Indices of focused sound sources that constitute multipole Although equations (9) and (10) relate to driving functions obtained in a two-dimensional plane assuming a line sound source as a sound source, other driving functions may be used. For example, driving functions obtained in a two-dimensional plane assuming a point sound source as a sound source may be used as shown in equations (11) and (12). The filter coefficient determination unit 11*c* may calculate the driving functions using equation (11) and calculate weighted driving functions of equation (12).

[Math. 11]

$$D_{2D}(x_i, x, \omega) = -\frac{(jk)^{3/2}}{2} \frac{y_i - y}{|x_i - x|} H_1^{(1)}(k|x_i - x|), \quad \text{Equation (11)}$$

[Math. 12]

$$D(x_i, \omega) = \sum_{\alpha=-N}^{N} \sum_{\beta=-N+|\alpha|}^{N-|\alpha|} S_{\alpha,\beta}(\omega) \cdot D_{2D}(x_i, x_{\alpha,\beta}, \omega) \quad \text{Equation (12)}$$

When the filter coefficient determination unit 11*c* has calculated the weighted driving functions for the speakers of the linear speaker array, the convolution calculation unit 15 convolves the weighted driving functions with the input signals to calculate output signals to be given to the speakers.

In the fifth embodiment, the signal processing apparatus 2*c* obtains weighted driving functions to be assigned to the speakers of the linear speaker array and convolves the weighted driving functions with the input signals to calculate output signals to be given to the speakers. In the fifth embodiment, it is possible to realize a virtual multipole speaker array where focal coordinates are provided in a grid pattern, like the positions of speakers illustrated in FIG. 1.

Figure 9:
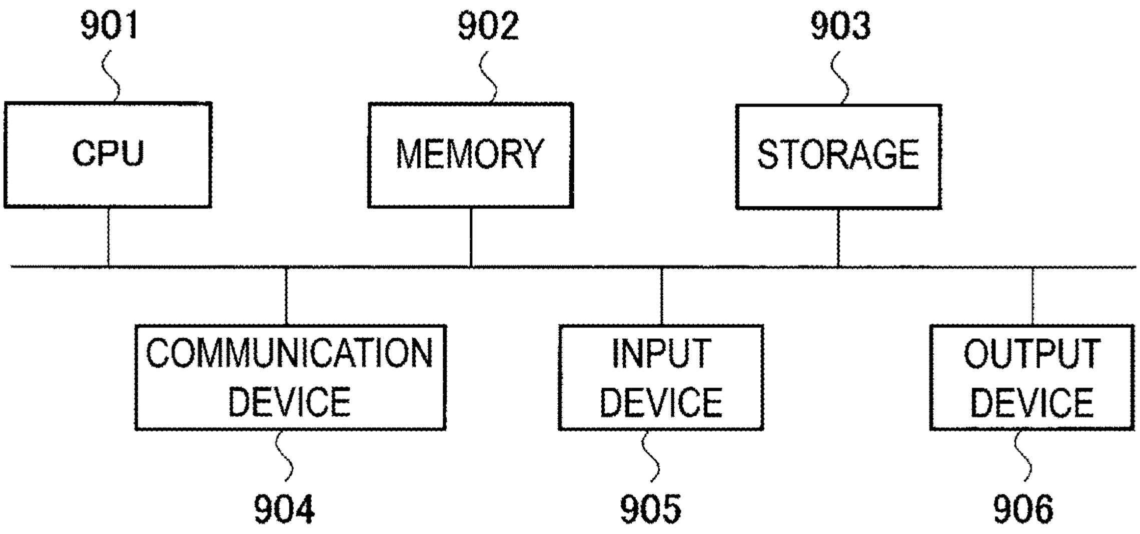
FIG. 9 is a diagram illustrating a hardware configuration of a computer used for a signal processing apparatus.

For example, a general-purpose computer system including a central processing unit (CPU) (a processor) 901, a memory 902, a storage 903 (a hard disk drive (HDD) or a solid state drive (SSD)), a communication device 904, an input device 905, and an output device 906 as illustrated in FIG. 9 is used for the signal processing apparatus 2 and the like of the present embodiments described with reference to FIGS. 5 to 8. Each function of the signal processing apparatus 2 is realized by the CPU 901 in the computer system executing a predetermined signal processing program loaded on the memory 902.

Each signal processing apparatus 2 may include an input/output interface for receiving/outputting input signals, conditions for calculating output signals, and output signals.

The signal processing apparatus 2 may be implemented on one computer or may be implemented on a plurality of computers. The signal processing apparatus 2 may also be a virtual machine implemented on a computer.

The signal processing program may be stored in a computer-readable recording medium such as an HDD, an SSD, a universal serial bus (USB) memory, a compact disc (CD), a digital versatile disc (DVD), or may be distributed via a network.

The present invention is not limited to the above embodiments and many modifications can be made within the scope of the gist thereof.

REFERENCE SIGNS LIST

1 Speaker array
2 Signal processing apparatus
11 Filter coefficient determination unit
12 Convolution calculation unit
13 Focal coordinate determination unit
14 Circular harmonic series conversion unit
901 CPU
902 Memory
903 Storage
904 Communication device
905 Input device
906 Output device

The invention claimed is:

1. A signal processing apparatus comprising:

a focal coordinate determination unit, implemented using one or more computing devices, configured to determine, as positions of a plurality of focused sound sources used to superimpose multipoles of a given order, intersections of (i) a first plurality of virtual lines arranged parallel to each other at a first interval and (ii) a second plurality of virtual lines that are perpendicular to the first plurality of virtual lines and that are arranged parallel to each other at a second interval;

a circular harmonic series conversion unit, implemented using one or more computing devices, configured to calculate weighting coefficients to be assigned to the multipoles of the given order superimposed by the plurality of focused sound sources from a circular harmonic series;

a filter coefficient calculation unit, implemented using one or more computing devices, configured to calculate weighted driving functions to be assigned to a plurality of speakers constituting a linear speaker array from the positions of the plurality of focused sound sources and the weighting coefficients assigned to the multipoles; and a convolution calculation unit, implemented using one or more computing devices, configured to convolve the weighted driving functions with input signals to calculate output signals to be given to the plurality of speakers.

* * * * *